Sept. 22, 1942.  W. M. ACKER  2,296,248

STEAM TRAP

Filed Sept. 6, 1940

INVENTOR.
WELLINGTON M. ACKER
BY Kwis Hudson & Kent
ATTORNEYS.

Patented Sept. 22, 1942

2,296,248

UNITED STATES PATENT OFFICE 2,296,248

STEAM TRAP

Wellington M. Acker, Lakewood, Ohio, assignor to W. M. Acker Organization, Inc., Cleveland, Ohio, a corporation of Ohio Application September 6, 1940, Serial No. 355,646

3 Claims. (Cl. 137—101)

The present invention relates to tilting type, automatic traps, commonly called "tilting steam traps," and has for its object the provision of a novel tilting type, automatic trap of improved general construction.

Heretofore it has been customary to rotatably support the tilting assembly, including the tank, etc., of tilting steam traps in combined trunnion or rocking pipe bearings and packing glands through the medium of oppositely projecting tubular portions of the trunnion or rocking pipe, which tubular portions project through the packing glands and into the respective bearings. With this construction the weight of the tilting assembly is carried by the packing which in a very short time becomes worn and leaks with the result that the bearings wear excessively and the trap does not operate satisfactorily. Numerous attempts have been made to overcome this and other defects of the prior art traps prior to the present invention but none of these attempts has proven commercially satisfactory.

The principal object of the present invention is to overcome the defects of prior traps and to provide a simple, reliable tilting type, automatic trap wherein the weight of the tilting assembly, including the tank, etc., is transmitted from the trunnion direct to a rigid base plate or support through the medium of suitable bearings independent of the inlet and outlet connections to the tank, and upon which base plate the inlet and outlet connections are also supported independent of the trunnion support. The construction of the base, etc., is such that the various parts cannot become disaligned.

Another feature of the present invention is the provision of a novel and improved bumper for engaging the tank proper of a tilting type, automatic trap of the character referred to which will be simple in construction and reliable in operation and in which water, dirt, etc., will not accumulate.

The present invention resides in certain details of construction and combinations and arrangements of parts and further objects and advantages thereof will be apparent to those skilled in the art to which the invention relates from the following description of the preferred embodiment thereof described with reference to the accompanying drawing forming a part of this specification in which similar reference characters designate corresponding parts throughout the various views and in which.

Figure 1:
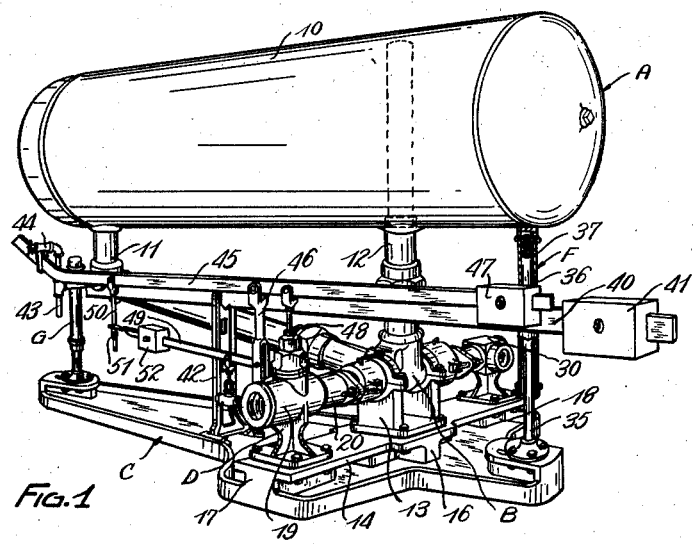
Fig. 1 is a perspective view with portions in section, of a tilting type, automatic trap embodying the present invention.
Figure 3:
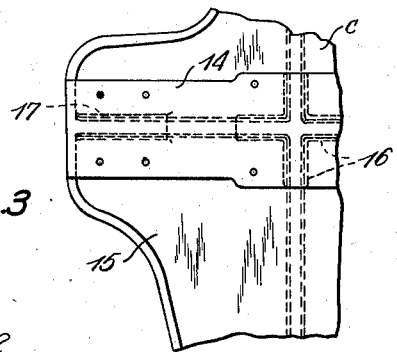
Fig. 3 is a plan view of a portion of tthe base.

Referring to the drawing wherein the preferred embodiment of the invention is shown in considerable detail, the tilting assembly is designated generally by the reference character A and comprises a tank 10 supported by two pipe connections designated generally as 11 and 12 connected thereto and to a trunnion member, designated generally as B. The trunnion member B is provided with cylindrical bearing surfaces at opposite sides of the places where the pipes 11 and 12 are connected thereto through the medium of which bearing surfaces the trunnion assembly is fulcrumed in suitable journal boxes formed integral with a bracket 13. The bracket 13 rests upon and is securely bolted to the upper portion 14 of an integral base C which includes a main body portion 15. The two body portions 14 and 15 of the base C are connected together by webs 16, 17 and 18 hereinafter more specifically referred to.

Figure 2:
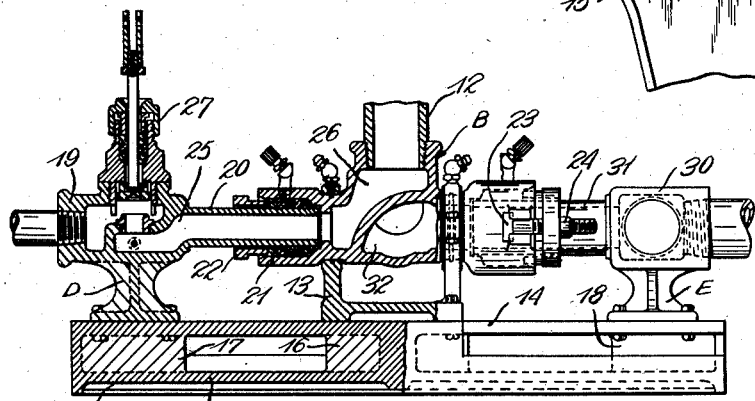
Fig. 2 is a vertical section with portions shown in elevation on the center line through the trunnion and the inlet and outlet connections.

The steam connection to the trap is made through an inlet steam valve assembly D comprising an inlet steam valve body 19 which includes a tubular portion 20 the right-hand end of which projects into the left-hand side of the trunnion member B, as viewed in Fig. 2 of the drawing. The left-hand side of the trunnion member B into which the tubular portion 20 of the steam inlet valve body projects is counterbored to provide a stuffing box for the reception of packing 21 adapted to be retained in position by a packing gland 22 held in position and adapted to be adjusted by suitable T-bolts 23, the heads of which engage projections on the trunnion member B. The shank portions of the bolts 23 project through suitable apertures in the packing gland 22 where they are provided with nuts 24. The bore 25 of the inlet steam valve body 19 communicates with a chamber 26 formed in the trunnion member B. The connection between the chamber 20 in the trunnion member B and the interior of the tank 10 is made by the pipe 12. The inlet steam valve assembly D includes the inlet steam valve 27, commonly referred to as the steam valve, and like the trunnion member B rests upon the upper portion 14 of the base C to which it is securely bolted.

The water or condensate connection to the trap is made through the water inlet and outlet assembly E including a hollow or bored member 30 which, as shown, has three tapped apertures for the connection of suitable pipes. The member 30 is provided with a tubular cylindrical portion 31 projecting to the left, as viewed in Fig. 2 of the drawing. The tubular portion 31 of the water inlet and outlet assembly is similar to the tubular portion 20 of the inlet steam valve assembly and like portion 20 of the inlet steam valve assembly projects into a counterbored aperture in the adjacent side or end of the trunnion member B. The connection between the tubular portion 31 of the water inlet and outlet member 30 and the trunnion member B comprises a stuffing box, packing and packing gland similar to that provided for the connection between the tubular portion 20 of the inlet steam valve body 19 and the trunnion member B and will not be described in detail. The similar parts are designated by the same reference characters. The bore of the water inlet and outlet member 30 communicates with a chamber 32 in the trunnion member B, which chamber 32 is in turn connected to the tank 10 by the pipe 11. Like the inlet steam valve assembly D the water inlet and outlet assembly E rests upon and is bolted to the upper portion 14 of the base C.

The base C is formed in one integral part, and the part thereof upon which the trunnion member B, the inlet steam valve body member 19, and the water inlet and outlet member 30 is supported, is of box or bridge construction. The upper portion 14 upon which the aforementioned members rest is spaced from the main portion 15 of the bed but connected thereto by reenforcing webs 16, 17 and 18 cast integral with the base underneath those portions of the upper member 14 upon which the trunnion member, inlet steam valve body, and water inlet and outlet member respectively rest. The trunnion member, inlet steam valve body, and water inlet and outlet member are supported on the base independent of each other and the base construction shown eliminates all possibility of the base warping and throwing these parts out of alignment. This is an important feature of the present invention since any warping of the base will disalign the inlet steam valve body and/or the water inlet and outlet member with the trunnion member B, with the result that the packing glands will wear excessively and leak and the operation of the trap will be unsatisfactory.

As is well understood in the art, the normal position of the tilting assembly A is such that the tank 10 is horizontal in which position it rests upon a bumper F comprising a stationary vertical member 35 fixed to the base C, a tubular member 36 closed at its upper end and telescoped over the member 35, and a yieldable spring 37 interposed between the top of the member 35 and the bottom of the bore in the member 36. The important feature of the present bumper is the fact that moisture, dirt, etc., will not accumulate therein because the member 36 opens downwardly.

The tilting assembly is held in its normal horizontal position by a lever 40 provided with a weight 41 which may be adjusted therealong. The lever 40 is fulcrumed on a bracket 42 and the end thereof opposite the weight 41 is connected to a boss 43 on the elbow forming a part of the pipe 11 and forms part of the tilting assembly. In this position water or condensate enters the tank 10 through the water inlet and outlet assembly E, the trunnion member B, and the pipe 11. When the weight of the water accumulated in the tank is sufficient to overcome the weight of the weighted lever 40, the tilting assembly A tilts until the tank 10 rests upon the bumper G at the opposite end of the base C, which bumper is similar in construction to the bumper F previously referred to except for the fact that it is not quite as high. This action causes a roller 44 carried by a pipe connected to the member 43 to bear against the left-hand end of a lever 45 pivotally connected to the upper end of a link 46 and rotate the same in a counterclockwise direction as viewed in Fig. 1. The link 46 is pivotally connected to the inlet steam valve assembly and the lever 45 is provided with an adjustable weight 47. Rotation of the lever 45 about its pivot in the manner previously mentioned opens the inlet steam valve 27 and closes a relief valve 48 to the bore 25 of the inlet steam valve assembly D. The relief valve 48 is connected to a lever 49, the right-hand end of which is pivotally connected to the link 46 previously mentioned, while the left-hand end thereof is connected to the lever 45 by a link 50 including an adjustable member 51 which limits the downward movement of the lever 49. The lever 49 is provided with an adjustable weight 52 which forces the relief valve 48 closed when the lever 45 and in turn the link 50 are lowered by the tilting of the tilting assembly.

Upon the discharge valve being opened, boiler pressure or the like is admitted to the tank 10 by way of the chambers 25 and 26 in the inlet steam valve assembly and the trunnion member B respectively and the pipe 12, thereby either equalizing the pressure in the tank 10 and the pressure in the boiler allowing the water or condensate in the tank to flow by gravity through the pipe 12, the chamber 32 in the trunnion member B, and the water inlet and outlet assembly E, or causing the pressure in the tank 10 above the condensate or water to discharge the water in the tank at an elevated position, as is well understood in the art. The condensate or water and boiler pressure is prevented from entering the heating system or the like by a check valve (not shown) which also prevents the entry of water or condensate to the tank until the tank resumes its normal position. The weight 41 is preferably adjusted in such a manner that shortly before all of the water or condensate in the tank is discharged, the weight returns the tilting assembly to its normal position with the tank horizontal. This action closes the inlet steam valve 27 and opens the relief valve 48. The tank 10 is quickly freed of any remaining pressure contained therein upon the opening of the relief valve and is again ready to receive water or condensate from the heating system, etc.

From the foregoing description of the preferred embodiment of the invention it will be apparent that the objects heretofore mentioned and others have been accomplished and that a novel and improved tilting type of automatic trap has been provided. While the invention has been herein illustrated and described as embodied in what is commonly called an automatic return trap, it will be apparent to those skilled in the art to which the invention relates that it is equally applicable to tilting type traps known as non-return traps, vacuum traps, etc. As previously stated, the present invention is not limited to the particular construction shown but it is my intention to hereby cover all adaptations, modifications and uses thereof which come within the practice of those skilled in the art to which the invention relates.

Having thus described my invention what I claim is:

1. In a tilting trap of the character referred to, the combination of: a base; a tilting assembly comprising a single elongated substantially horizontal tank, a trunnion member having a plurality of chambers therein communicating with axially aligned bores opening into opposite ends of said trunnion member, and means including conduits communicating with the interior of said tank and with said chambers for connecting said tank to said trunnion member and supporting the former above the latter, said trunnion member being provided with journals coaxial with said bores and located at opposite sides of the connection with said tank; means including a member supported on said base and having journal boxes surrounding said journals on said trunnion member for pivotally supporting said trunnion member and in turn said tilting assembly on said base for rotation about an axis coaxial with said bores; an inlet steam valve assembly located at one side of said trunnion member in line with one of said axially aligned bores in the end of the latter and supported on said base independent of the means for supporting said trunnion member thereon; said inlet steam valve assembly comprising a stationary inlet steam valve body including a tubular projection in axial alignment with and extending into the bore in the end of said trunnion member adjacent thereto; a packing gland for connecting said tubular projection of said inlet steam valve body within said bore so as to permit rotaton of said trunnon member relative to said inlet steam valve body while preventing the escape of steam or water; a water inlet and outlet assembly located at the side of said trunnion member opposite said inlet steam valve assembly in alignment with said trunnion member and supported on said base independent of the means for supporting said trunnion member on the latter; said water inlet and outlet assembly including a stationary hollow member comprising a tubular projection in alignment with and extending into the bore in the end of said trunnion member adjacent thereto; and a packing gland for connecting said last-named tubular projection within said bore so as to permit rotation of said trunnion member relative to said water inlet and outlet assembly while preventing the escape of steam or water.

2. In a tilting trap of the character referred to, the combination of: an integral base comprising an elongated body portion and a transversely extending elevated portion connected to the body portion by three aligned webs; a tilting assembly comprising a single elongated substantially horizontal tank, a trunnion member having a plurality of chambers therein communicating with axially aligned bores opening into opposite ends of said trunnion member, and means including conduits communicating with the interior of said tank and with said chambers for connecting said tank to said trunnion member and supporting the former above the latter, said trunnion member being provided with journals coaxial with said bores opening into the ends of said trunnion member, said journals being located on opposite sides of said means for connecting said tank to said trunnion member; a member supported on the elevated portion of said base directly above the center one of said webs and including journal boxes surrounding said journals on said trunnion member for pivotally supporting said trunnion member and in turn said tilting assembly on said base for rotation about an axis coaxial with said bores and transverse to the length of said tank; an inlet steam valve assembly located at one side of said trunnion member in line with one of said bores in the end of the latter and supported on the elevated portion of said base directly above one of said webs independent of the means for supporting said trunnion member thereon; said inlet steam valve assembly comprising a stationary inlet steam valve body including a tubular projection in axial alignment with and extending into the bore in the end of said trunnion member adjacent thereto; a packing gland for connecting said tubular projection of said inlet steam valve body within said bore so as to permit rotation of said trunnion member relative to said inlet steam valve assembly while preventing the escape of steam or water; a water inlet and outlet assembly located at the side of said trunnion member opposite said inlet steam valve assembly in alignment with said trunnion member and supported on the elevated portion of said base above one of said webs independent of the means for supporting said trunnion member thereon; said water inlet and outlet assembly including a stationary hollow member comprising a tubular projection in alignment with and extending into the bore in the end of said trunnion member adjacent thereto; and a packing gland for connecting said tubular projection on said stationary hollow member within said bore so as to permit rotation of said trunnion member relative to said water inlet and outlet assembly while preventing the escape of steam or water.

3. In a tilting trap of the character referred to, the combination of: an integral base comprising an elongated body portion and a transversely extending elevated portion connected to the body portion by three aligned webs; a tilting assembly comprising a single elongated substantially horizontal tank, a trunnion member having a plurality of chambers therein communicating with axially aligned bores opening into opposite ends of said trunnion member, and means including conduits communicating with the interior of said tank and with said chambers for connecting said tank to said trunnion member and supporting the former above the latter, said trunnion member being provided with journals coaxial with said bores opening into the ends of said trunnion member, said journals being located on opposite sides of said means for connecting said tank to said trunnion member; a member supported on the elevated portion of said base directly above the center one of said webs and including journal boxes surrounding said journals on said trunnion member for pivotally supporting said trunnion member and in turn said tilting assembly on said base for rotation about an axis coaxial with said bores and transverse to the length of said tank; an inlet steam valve assembly located at one side of said trunnion member in line with one of said bores in the end of the latter and supported on the elevated portion of said base directly above one of said webs independent of the means for supporting said trunnion member thereon; said inlet steam valve assembly comprising a stationary inlet steam valve body including a tubular projection in axial alignment with and extending into the bore in the end of said trunnion member adjacent thereto; a packing gland for connecting said tubular projection of said inlet steam valve body within said bore so as to permit rotation of said trunnion member relative to said inlet steam valve assembly while preventing the escape of steam or water; a water inlet and outlet assembly located at the side of said trunnion member opposite said inlet steam valve assembly in alignment with said trunnion member and supported on the elevated portion of said base above one of said webs independent of the means for supporting said trunnion member thereon; said water inlet and outlet assembly including a stationary hollow member comprising a tubular projection in alignment with and extending into the bore in the end of said trunnion member adjacent thereto; a packing gland for connecting said tubular projection on said stationary hollow member within said bore so as to permit rotation of said trunnion member relative to said water inlet and outlet assembly while preventing the escape of steam or water; a counterforce system operatively connected to said base and said tilting assembly; and means for limiting the rotation of said tilting assembly comprising stationary vertical members fixed to said base adjacent to opposite ends thereof, tubular members closed at their upper ends telescoped over said stationary vertical members, and resilient means within said tubular members interposed between the upper ends of said stationary vertical members and the bottom of the openings in said tubular members.

WELLINGTON M. ACKER.